March 27, 1956 F. E. PAYNE Re. 24,135

ROTARY MECHANICAL SEAL

Original Filed Nov. 14, 1949

INVENTOR.
Frank E. Payne
BY
Charles F. Voytich
Atty

United States Patent Office

Re. 24,135
Reissued Mar. 27, 1956

24,135

ROTARY MECHANICAL SEAL

Frank E. Payne, Glencoe, Ill., assignor to Crane Packing Company, Chicago, Ill., a corporation of Illinois Original No. 2,645,508, dated July 14, 1953, Serial No. 127,115, November 14, 1949. Application for reissue April 29, 1954, Serial No. 426,625

9 Claims. (Cl. 286—11)

Matter enclosed in heavy brackets [ ] appears in the original patent but forms no part of this reissue specification; matter printed in italics indicates the additions made by reissue.

This invention relates to rotary mechanical seals of the type which effect a seal on a radial plane. For purposes of illustration the invention will be described with reference to its use in a pump such as the water pump of an automobile although it is understood that it is not limited to such use.

In the assembly of water pumps, it is desirable that the operator devote as little time and thought as possible to the assembly of the seal with which each pump is equipped. Such seals are a specialty and are more likely to be assembled properly if the assembly is performed by the seal manufacturer. For this reason, it is desirable that mechanical seals for automotive purposes be preassembled at the factory and handled thereafter as complete units.

A broad object of this invention, therefore, is to provide a rotary mechanical seal for pumps or the like which is adapted to be preassembled at the factory of the seal manufacturer so that the seal may thereafter be installed as a unit without any particular thought or experience on the part of the assembly man of the equipment manufacturer.

Inasmuch as mechanical seals are required to provide a barrier between a fluid and the outside atmosphere, it is inevitable that part of the seal is exposed to the fluid at all times. The part thus exposed is subject to corrosion unless properly protected by a noncorrosive coating. Such coating operations, however, are costly and hence undesirable. The corrosion is particularly undesirable when it appears in the spring usually employed to hold the sealing washer of the seal against the cooperating radial surface on the relatively rotatable part. When the spring corrodes, its diameter decreases and its strength likewise decreases, thereby giving the seal a different action than the one originally designed. The spring pressure normally decreases as the seal wears due to the expansion required in order to make the seal compensate for wear. The corrosion thus aggravates an already bad condition.

A more specific object of this invention is to provide a seal for pumps or the like for corrosive fluids wherein the spring is not immersed in the corrosive fluid and likewise is not required to be coated with a protective coating.

Modern automotive engines using water as a cooling medium are being presently designed with closed systems which are maintained at a positive pressure other than atmospheric. This pressure may reach 15 pounds per square inch and will, of course, be transmitted to all parts of the cooling system, including the seal. Unless the seal is properly designed, the fluid pressure within the system may tend to counteract the action of the spring tending to hold the seal closed and will thus result in a sudden unwanted opening of the seal with a resultant loss of fluid and pressure.

It is a further object of this invention, therefore, to provide a seal which is substantially hydraulically balanced so that the seal will not inadvertently open due to the pressure of the fluid being sealed.

These and other objects and features of this invention will become apparent from the following detailed description when taken together with the accompanying drawings, in which Fig. 1 is a quarter-section taken through a seal embodying the features of this invention;

Figure 1:
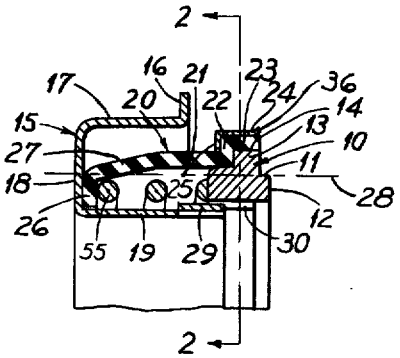

Referring now to the drawings for a detailed description of the invention, the seal is comprised of a washer 10 having a forwardly extending nose portion 11 on which is formed a radially disposed surface 12 which is perfectly flat and smooth so as to form a fluid-tight seal with the relatively rotatable member with which it is to cooperate. Said washer 10 has a radially outwardly extending flange 13, the outer surface 14 of which is substantially cylindrical in contour. The washer 10 may be made of any material suitable to the fluid to be sealed and may be a molded thermosetting resin having dispersed therein metallic particles for better heat conductivity and wear resistance.

Concentrically disposed with respect to washer 10 is a retainer 15 preferably made as a single-piece stamping having an outwardly extending flange 16, a substantially cylindrical section 17, a radially disposed section 18 and an inner cylindrically disposed section 19, the right-hand end of which (Fig. 1) telescopes into washer 10 so as to center the washer with respect to the retainer. It is contemplated that outer cylindrical section 17 will be press-fitted into one of the relaively rotatable members to be sealed and the press-fit is of such nature as to be fluid-tight. Flange 16 is utilized to locate the retainer 15 with reference to the said relatively rotatable part to be sealed.

A seal is effected between washer 10 and retainer 15 by means of a sleeve 20 made of rubber, either natural or synthetic or a combination of the two, so as to be flexible and readily deformable. Said sleeve 20 is comprised of a substantially cylindrical section 21, a shoulder 22 and an outer cylindrical section 23, the latter being adapted to fit snugly over flange 13 of washer 10. A fluid-tight seal is assured between sleeve 20 and washer 10 by means of a metal band or ferrule 24, the inside diameter of which is such as to squeeze or preload section 23 of sleeve 20 upon the surface 14 of washer 10. A radially inwardly disposed flange 25 on band 24 is utilized to limit the forward axial movement of band 24 during the assembly operation of the band, sleeve 20 and washer 10.

The rear end of sleeve 20 opposite washer 10 is comprised of a radially inwardly disposed flange 26 and a tapered section 27 which connects flange 26 with cylindrical section 21 of the sleeve 20.

An initial sealing pressure is developed by a spring 55, one end of which contacts flange 26 of sleeve 20 and the other end of which bears directly against the rear side of the washer 10. It is contemplated that the free effective length of the spring will be substantially the same as the axial space between washer 10 and flange 26 so as to exert a minimum distorting force upon flange 26.

The outer diameter of flange 26 is so chosen that it will approximately equal the outer diameter of bead 11 so that a line such as 28 drawn through the outer edge of bead 11 parallel with the axis of the seal will pass also through the rear portion of section 27. Inasmuch as the maximum of the spring 55 is less than the outside diameter of the sealing surface 12, fluid pressure applied to the flexible resilient sleeve 20 from the outside thereof may serve to compress or constrict the sleeve so that portions thereof extend within the cylindrical confines of the nose portion 11. The sleeve may thus hug the convolutions of the spring 55 and even extend into the interstices thereof and act against the shoulder portion 22 as well as against the rear face of the washer within the cylindrical confines of the nose portion 11 so that the tendency will be to move the washer 10 to the right as viewed in Fig. 1. This tendency is in the direction of holding the washer against its cooperating relatively rotating surface and hence is in a direction to maintain a seal. The line 28 therefore may be said to constitute a balance line for the seal. Actually the line 28 is merely a line, as such, in the illustrated drawing of Fig. 1. In reality it represents a cylindrical contour within which forces acting on the washer 10 in a direction to move the washer against the seat will overbalance the forces acting on the washer in the opposite direction.

Torque load resulting from the friction produced on surface 12 by surface 33 is removed from sleeve 20 by means of a plurality of lugs 29 formed in inner cylindrical section 19 and extending into corresponding recesses 30 on the inside of washer 10, only one such lug being shown for the sake of simplicity, it being understood that as many such lugs will be used as is required to give an even distribution of force around the washer.

It is apparent that washer 10, sleeve 20 and ferrule 24 when assembled with a press-fit will constitute a unitary subassembly. Prior to the assembly of these three elements, spring 55 is inserted in the sleeve 20 so that it becomes a part of the said subassembly. This subassembly may be readily handled as a unit, but according to automotive practices, it is preferable that this subassembly be also fixed to retainer 15 so that the retainer as well as sleeve 20, spring 55, washer 10 and band 24 may be handled as a single unit. To this end, suitable cement is applied to flange 26 and the radial portion 18 of the retainer 15 so that flange 26 will adhere to radial portoin 18 and thus unite the aforesaid subassembly with retainer 15.

Figure 3:
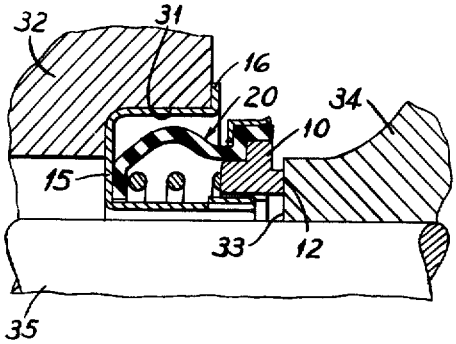
Fig. 3 is a quarter-section taken through a seal of the type shown in Fig. 1, the seal being illustrated in the position it will assume when installed in an automotive water pump.

Referring to Fig. 3, the seal of Fig. 1 is shown in its installed position. Furthermore, it is shown in the position it will assume before any fluid pressure is applied to the exterior of the sleeve 20. It will be observed that retainer 15 is pressed into a recess 31 in a housing 32 which may be a pump housing. Washer 10 has its surface 12 pressed against a radially disposed surface 33 on a rotatable pump impeller 34 which is pressed upon a drive shaft 35 with a fluid-tight press-fit. It is not known definitely just what shape the sleeve 20 will assume when pressure is exerted upon it from the outside but it will of course tend to collapse into the spring to a greater or lesser degree, depending upon the amount of pressure of the fluid to be sealed. Tests, however, have indicated that a seal constructed in the manner described will maintain a seal under pressures as high as 40 pounds per square inch.

It will be noted that the cross-section of sleeve 20 is such that there are no reentrant curves. This means that sleeve 20 may be made in a simple two-part mold and may also be injection molded, both of which molding techniques are highly desirable from the standpoint of economy of manufacture and excellence of the finished product.

In assembling the seal, the washer 10 and spring 55 are inserted in a sleeve 20 and then a band 24 is pressed over the outer cylindrical region 23 of sleeve 20. Due to the fact that band 24 is of slightly smaller diameter than the outside diameter of portion 23, a slight ridge will normally be formed in the cylindrical portion 23 ahead of band 24 tending to resist the assembly of the band with respect to sleeve 20. If the end of the band were not properly finished and rounded off, there would be a tendency to cut the sleeve by the band, thereby reducing the effectiveness of the seal between sleeve 20 and washer 10. To obviate this difficulty, the forward end 36 of sleeve 24 is flared outwardly slightly to enable the material of section 23 to slide under the band as the band is advanced upon washer 10.

Figure 4:
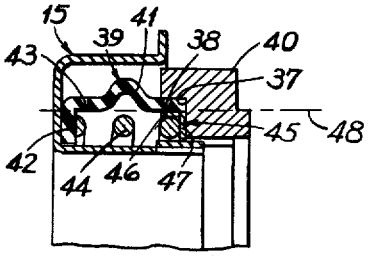
Fig. 4 is a quarter-sectional view of a modification of the seal of Fig. 1.
Figure 2:
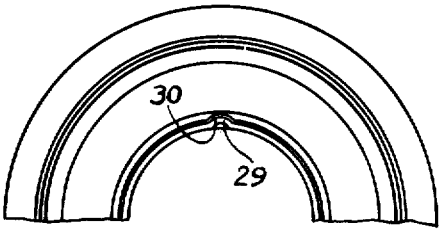
Fig. 2 is a front elevation of the seal of Fig. 1 taken along line 2—2 of Fig. 1.

In the modification shown in Fig. 4, the retainer 15 is the same, but the washer has been altered so as to provide an internal recess 37 into which the cylindrical end 38 of a sleeve 39 may be inserted. Sleeve 39 is preferably made of rubber, either natural or synthetic or a combination of the two, so as to be readily flexible or deformable, thereby permitting relative movement between the washer 40 and retainer 15. In order to facilitate the said relative movement between the washer and retainer 15 through means other than the natural deformability of the material of the sleeve, [and] *the* said sleeve 39 is formed with a bellows or fold section 41 intermediate the ends thereof, said section 41 being connected at one side to a radially disposed flange 42 through a substantially cylindrical section 43. A spring 44 is inserted between flange 32 and a band 45 having a substantially cylindrical section 46 which is utilized to compress end 38 into recess 37 to form a fluid-tight seal therebetween. The radially disposed portion 47 of band 45 abuts on washer 40 and limits the movement of band 45 in said washer 40.

The foregoing Fig. 4 modification may be press-fitted into a pump housing such as is shown in Fig. 3 [is] *in* a manner identical to that described with reference to the Fig. 1 form. As in the said Fig. 1 form, the spring 44 is not immersed in the fluid and hence is not subjected to corrosive action which such immersion would entail. It will be noted that a balance line 48 may be established in the Fig. 4 modification which is similar to the balance line 28 of Fig. 1 so that the seal is also substantially hydraulically balanced to resist an inadvertent opening thereof due to an increase in pressure in the fluid being sealed.

Figure 5:
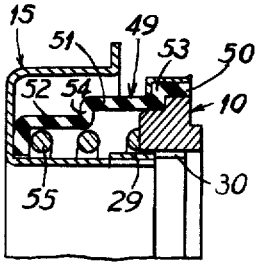
Fig. 5 is a quarter-sectional view of a second modification of the seal shown in Fig. 1.

In the Fig. 5 modification, the retainer 15 is again identical with that shown in Fig. 1 as are the spring 55 and the washer 10. The sleeve, however, is different and as shown at 49 is comprised of three substantially cylindrical sections 50, 51 and 52 connected by radial sections 53 and 54. The radial sections 53 as well as the cylindrical section 50 correspond to the radial section 22 and cylindrical section 23 of sleeve 20 of Fig. 1. The radial section 54 takes the place of the bellows 41 and provides a controlled flexibility which may be advantageous for very light spring pressures and relatively large axial vibration of washer 10 with respect to retainer 15. The sleeve 49 is likewise capable of being molded in a simple two-part mold, or by an injection molding process. The manner of assembling the modification shown in Fig. 5 is identical with that shown in Fig. 1, and its action when installed in a pump will be similar to that shown in Fig. 3.

It is understood that the foregoing description is illustrative of preferred embodiments of this invention and that the scope of the invention is not to be limited thereto, but is to be determined by the appended claims.

What is claimed is:

1. A seal for relatively rotatable elements one of which is in the form of a shaft, said seal comprising a washer adapted to surround the shaft and having an inner and an outer cylindrical surface and a front face provided with a centrally disposed forwardly extending annular nose portion providing a radial sealing surface adapted to bear against a surface normal to and fixed relative to the shaft, said sealing surface being offset forwardly from the front face of the washer, a deformable sleeve of elastomeric material, said sleeve having a radially inwardly disposed flange at one end, a substantially cylindrical region at its other end and an inwardly deformable intermediate region adapted to accommodate relative axial movement between the ends of the sleeve, means for compressing the cylindrical region of said sleeve against the outer cylindrical surface on the washer to form a fluid-tight connection therebetween, a retainer adapted to surround said shaft and having a cylindrical portion extending into said washer and serving to support the same and a radial wall disposed rearwardly of said washer and against which the inwardly disposed flange of said deformable sleeve bears, a coil spring disposed within the sleeve and adapted to surround said shaft and bearing at one end against said inwardly disposed flange and at the other end against said washer adjacent the inner cylindrical surface and within the extended cylindrical confines of said nose portion to prevent rearward shifting of the washer relative to said retainer and to maintain said deformable sleeve at least in part extended, portions of said sleeve, upon inward deformation thereof, being capable of contraction to a region within said extended cylindrical confines of said nose portion, and interengaging means on said cylindrical portion of the retainer and on the washer for establishing a driving connection therebetween.

2. A seal as described in claim 1, said intermediate region of the sleeve being provided with a conical tubular section so that relative axial movement between the ends of the sleeve is facilitated, and said sleeve having an outside diameter at the periphery of said inwardly disposed flange which is approximately equal to the outside diameter of the sealing surface on the washer.

3. A seal as described in claim 1, said means for compressing the cylindrical region of the sleeve against the cylindrical surface comprising a rigid ferrule having a cylindrical part surrounding the said region to compress said region against the washer, and a radially inwardly extending part adapted to react against the washer through the sleeve to limit axial movement of the ferrule relative to the washer.

4. A seal as described in claim 1, said sleeve having a fold therein medially thereof to facilitate relative axial movement between the ends thereof.

5. A seal for relatively rotatable elements, one of which is in the form of a shaft, said seal comprising a washer adapted to surround the shaft and having a cylindrical peripheral surface and a front face provided with a centrally disposed forwardly extending annular nose portion providing a radial sealing surface adapted to bear against a surface normal to and fixed relative to the shaft, said sealing surface being offset forwardly from the front face of the washer, said washer being provided with an annular recess in its rear face, a deformable sleeve of elastomeric material, said sleeve having a radially inwardly disposed flange at one end, a substantially cylindrical region at its other end and an inwardly deformable intermediate region adapted to accommodate relative axial movement between the ends of the sleeve, said sleeve also being provided with an inwardly offset portion receivable in the annular recess in the rear face of the washer, a clamping ring surrounding the forward end of the sleeve and compressing the same against the cylindrical surface on the washer and into said recess to form a fluid-tight connection between the sleeve and washer, a retainer adapted to surround said shaft and having a cylindrical portion extending into said washer and serving to support the same and a radial wall disposed rearwardly of said washer and against which the inwardly disposed flange of said deformable sleeve bears, a coil spring disposed within the sleeve and adapted to surround said shaft and bearing at one end against said inwardly disposed flange and at the other end against said washer in the central regions thereof and within the extended cylindrical confines of said nose portion to prevent rearward shifting of the washer relative to said retainer and to maintain said deformable sleeve at least in part extended, portions of said sleeve, upon inward deformation thereof, being capable of contraction to a region within said extended cylindrical confines of said nose portion, and interengaging means on said cylindrical portion of the retainer and on the washer for establishing a driving connection therebetween.

*6. A seal for relatively rotatable elements comprising a washer adapted to surround one of the elements and having inner and outer surfaces and a front face providing a substantially radially disposed sealing surface adapted to bear against a surface on the other element, a deformable sleeve of elastomeric material, said sleeve having a radially inwardly disposed flange at one end, a substantially cylindrical region at its other end and a deformable intermediate region adapted to accommodate relative axial movement between the ends of the sleeve, means for compressing the cylindrical region of said sleeve against the outer surface on the washer to form a fluid-tight connection therebetween, a retainer adapted to surround said one of the elements and having a cylindrical portion extending into and supporting said washer and a radial wall disposed rearwardly of said washer and against which the inwardly disposed flange of said deformable sleeve bears, a coil spring disposed within the sleeve and bearing at one end against said inwardly disposed flange and at the other end against said washer to resist rearward shifting of the washer relative to said retainer and to maintain said deformable sleeve at least in part extended, portions of said sleeve, upon inward deformation thereof, being capable of contraction to a region within the extended cylindrical confines of the outer diameter of the portion of the washer surface which bears against the surface on the other element, and interengaging means on said cylindrical portion of the retainer and on the washer for establishing a driving connection therebetween.*

*7. A seal as described in claim 6, said intermediate region including a radially disposed region to provide controlled flexibility for the sleeve.*

*8. A seal as described in claim 6, said intermediate region including a cylindrical region and a radially disposed region joined to one end of the cylindrical region to provide controlled flexibility for the sleeve*

*9. A seal as described in claim 6, said intermediate region including a cylindrical region adjacent the washer and having an outside radial dimension smaller than the outside diameter of the washer, and a radially inwardly disposed region joined to the end of the cylindrical region removed from the washer.*

References Cited in the file of this patent or the original patent

UNITED STATES PATENTS

| | | |
|---|---|---|
| 2,037,894 | Grisell | Apr. 21, 1936 |
| 2,192,395 | La Baur | Mar. 5, 1940 |
| 2,200,413 | Christman et al. | May 14, 1940 |
| 2,263,178 | Lignian et al. | Nov. 18, 1941 |
| 2,328,160 | Marvin | Aug. 31, 1943 |
| 2,365,351 | Matter | Dec. 19, 1944 |
| 2,373,463 | Curtis | Apr. 10, 1945 |
| 2,404,690 | Caserta | July 23, 1946 |
| 2,462,280 | Payne | Feb. 22, 1949 |
| 2,479,178 | Murphy | Aug. 16, 1949 |
| 2,489,545 | Storer et al. | Nov. 29, 1949 |

FOREIGN PATENTS

| | | |
|---|---|---|
| 109,667 | Sweden | Feb. 1, 1944 |
| 631,981 | Great Britain | Nov. 14, 1949 |

UNITED STATES PATENT OFFICE

CERTIFICATE OF CORRECTION

Reissue No. 24,135

March 27, 1956

Frank E. Payne

It is hereby certified that error appears in the printed specification of the above numbered patent requiring correction and that the said Letters Patent should read as corrected below.

Column 2, line 72, after "maximum" insert --diameter--.

Signed and sealed this 5th day of June 1956.

(SEAL)

Attest:

KARL H. AXLINE

Attesting Officer

ROBERT C. WATSON

Commissioner of Patents